United States Patent [19]
Fullington et al.

[11] 3,719,408
[45] March 6, 1973

[54] MOBILE MERCHANDISER CART AND REFRIGERATED SHOWCASE THEREFOR

[75] Inventors: William H. Fullington, Ballwin; Melvin O. Maisak, Florissant, both of Mo.

[73] Assignee: Pet Incorporated, St. Louis, Mo.

[22] Filed: Feb. 2, 1971

[21] Appl. No.: 111,898

Related U.S. Application Data

[62] Division of Ser. No. 835,455, June 23, 1969.

[52] U.S. Cl. ................................. 312/236, 312/250
[51] Int. Cl. ....... A47b 77/08, A47f 3/04, A47b 91/00
[58] Field of Search ........... 312/236, 250, 116; 62/95

[56] References Cited

UNITED STATES PATENTS

| | | | |
|---|---|---|---|
| 2,585,360 | 2/1952 | Williams | 312/236 X |
| 3,042,384 | 7/1962 | Bauman | 312/236 X |
| 2,030,780 | 2/1936 | Bicknell | 312/116 X |
| 2,836,039 | 5/1958 | Weber | 312/116 X |
| 3,261,650 | 7/1966 | Stromquist | 312/236 |

FOREIGN PATENTS OR APPLICATIONS

| | | | |
|---|---|---|---|
| 105,211 | 9/1938 | Australia | 312/250 |
| 963,537 | 7/1964 | Great Britain | 312/250 |
| 889,038 | 2/1967 | Great Britain | 312/116 |

Primary Examiner—Paul R. Gilliam
Attorney—Richard G. Heywood

[57] ABSTRACT

The combination of a mobile merchandiser cart for the transportation, storage and display of food and beverage products from the production source to the retail consumer, and a refrigerated showcase having a cart product area for receiving a merchandiser cart with a complementary fit.

2 Claims, 3 Drawing Figures

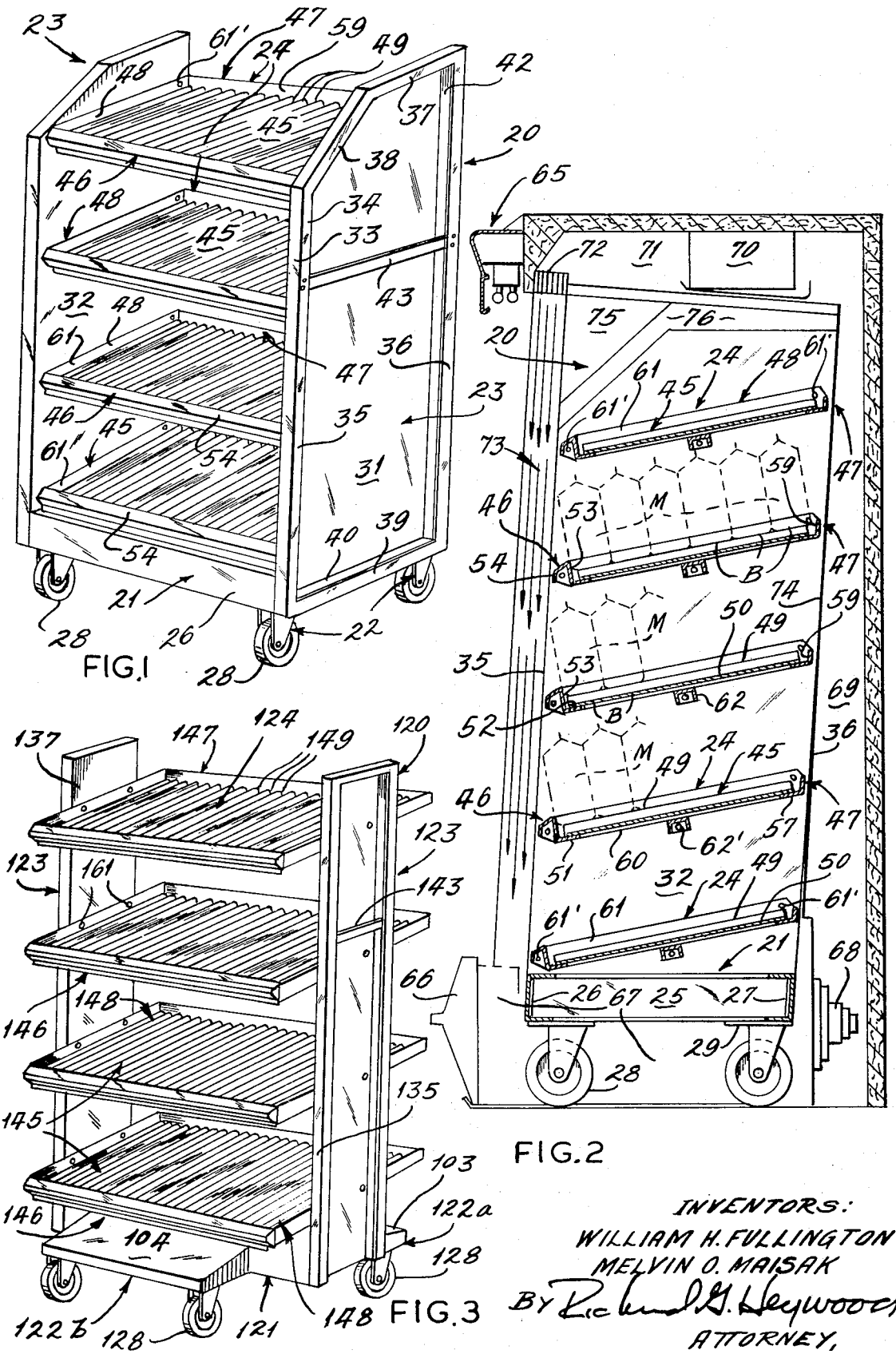

MOBILE MERCHANDISER CART AND REFRIGERATED SHOWCASE THEREFOR

DIVISIONAL APPLICATION

This application is a divisional application of co-pending application, Ser. No. 835,455 filed June 23, 1969 for Mobile Merchandiser Cart.

BACKGROUND OF THE INVENTION

The invention relates in general to merchandiser carts for food and beverage products and more particularly to improvements in mobile carts for transporting, storing and displaying a substantial weight and volume of such products in refrigerated environs.

The well-known concept of utilizing a mobile unit to function as a storage, transportation and display unit for various products has recently been stimulated in the food and beverage product field by reason of the substantial savings afforded by reduced handling costs of smaller case or tray units and the development of automatic product handling equipment capable of placing food or beverage containers into the cart in the production facility. Briefly stated, the mobile units are loaded with product (by automatic or semi-automatic equipment or by hand) at the production facility, and several units are loaded onto a truck and thus utilized in transporting the product to a food store (or other point of sale); these units then being unloaded from the truck and used in storing the product and/or in displaying the product at the food store for convenient consumer selection.

Prior art carts have been functional as a basic transportation and storage unit, but have not provided the degree of versatility for the use of different handling equipment for loading and unloading such carts from refrigerated trucks and, in addition, the prior art carts have not been fully acceptable as a merchandiser for display of product and have also presented cleaning and other problems.

SUMMARY OF THE INVENTION

The invention is embodied in a merchandiser cart for food and beverage products, including a rigid base frame with upstanding end panels, and plural shelves extending between the end panels and having sloping anti-friction product carrying surfaces.

One of the principal objects of the present invention is to provide an improved mobile unit for the transportation, storage and display of food and beverage products. Another object is to provide a merchandiser cart that is rigid and sturdily constructed to hold substantial weight and volume loads and prevent displacement thereof during transportation from the production facility and is easily moved by one person from area to area or to a display fixture. Another object is to provide a merchandiser cart having angular shelves to provide better product visibility during display and self-feeding of the rearward products to the front of the shelves for accessibility and convenient self-service by the consumer.

These and still other objects and advantages will become more apparent hereinafter.

BRIEF DESCRIPTION OF THE DRAWINGS

For purposes of illustration and disclosure, the invention is embodied in the parts and in the arrangements and combinations of parts hereinafter described and claimed. In the accompanying drawings which form a part of the specification and wherein like numerals refer to like parts wherever they occur:

FIG. 1 is a perspective view of a mobile merchandiser cart embodying the present invention, FIG. 2 is a cross-sectional view of the merchandiser cart illustrated in combination with the refrigerated fixture for display of the product shown in phantom lines, and FIG. 3 is a perspective view of another embodiment of the merchandiser cart adapted for nesting with similar carts.

DESCRIPTION OF THE PREFERRED EMBODIMENTS

Referring to FIG. 1 of the drawings, a merchandiser cart 20 embodying the present invention comprises a base frame 21 mounted on wheel units 22, opposed end panels 23 secured to the base 21 and a plurality of shelves 24 secured between the end panels 23.

The base frame 21 is of rectangular configuration having opposed end walls 25 and opposed front and back walls 26 and 27, respectively, all being channel-shaped or of open C-shape configuration and being welded or otherwise assembled together to form a rigid, integral base unit. The wheel units 22 are preferably of the caster-type in which the wheels 28 fully swivel on base plates 29 secured at the corners of the base frame 21.

The end panels 23 are formed with a main body panel 31 having a smooth inner surface 32 exposed to the product area of the cart 20, and the end panels 23 are formed peripherally with outwardly turned flanges 33 and inwardly turned flanges 34 defining channel-shaped vertically disposed front and rear marginal members 35 and 36, respectively, a horizontally disposed top marginal member 37 extending forwardly from the rear member 36 and an angular marginal member 38 interconnecting the front and top members 35 and 37. The bottom of the end panels 23 may be closed and reinforced by flanges 40 extending into the opposed channels of the front and rear members 35 and 36 to form tubular lower members 39. In addition, the front, rear, top and angular members 35, 36, 37 and 38 are reinforced by a supplementary channel-shaped insert member 42. The end panels 23 are rigidly secured to the end walls 25 of the base frame 21 by suitable means, such as welding or bolting. A hand bar 43 is secured at a convenient height between the front and rear members 35 and 36 on the inner surface of the inturned flanges of the insert member 42.

Each of the shelves 24 of the merchandiser cart 20 comprises an imperforate main body panel 45, a front rail member 46, a rear rail member 47 and side members 48. As will become more apparent hereinafter, an important feature of the invention resides in the product carrying surface characteristics of the main panel 45 and, as shown in the drawings, the preferred configuration of the main panel 45 is a corrugation providing a series of parallel ridges 49 and valleys 50.

The front rail member 46 extends transversely of the cart 20 between the end panels 23 and is formed with a supporting flange 51 for the main panel 45, a spill trough or channel 52 adjacent to, and preferably recessed below, the valleys 50 of the main panel 45, a vertically disposed product abutment surface 53 and an angular front wall 54 extending outwardly and downwardly to form an interior recess 55. This front wall 54 of the rail member 46 is constructed for use as a hand grip in manipulating the cart and the outer surface may also be fitted with conventional price tag or product identification means. The rear rail member 47 extends transversely between the end panels 23 and is formed with a support flange 57 for the main panel 45 and an upturned or vertically disposed flange 58 forming an inner abutment surface 59. The side rail members 48 extend along each laterally disposed edge of the main panel 45 and comprise an inturned support flange 60 for the main panel 45 and a vertically disposed flange 61 secured to the front and rear rail members 46 and 47 and, preferably closing off the ends of the spill trough 52. The main panel 45 is carried on and secured to the support flanges of the front, rear and side rails 46, 47 and 48 of the shelves, although it will be apparent that the main panel 45 and side rail flange 61 may be formed integral or the main panel 45 and front and rear rails 46 and 47 may be formed as an integral unit. The shelves 24 are mounted on the end panels 23 in a predetermined angular position sloping downwardly from the rear rail 47 to the front rail 46, the side rail flange 61 being secured to the inner surfaces 32 of the end panels in a manner to present substantially smooth surfaces to the product area of the shelves 24. Although the shelves 24 may be spot welded or permanently secured to the end panels 23, it is preferred that they be secured by bolts 61' extending through the flanges 61 adjacent to the rear rail 47 and in the recess 55 of the front rail 46.

In addition to other reinforcing means in the cart 20, inverted channel members 62 may be provided below the shelves 24 extending transversely between the end panels 23 and secured thereto by bolts 62' or the like for the purpose of strengthening the shelf means. The shelves 24, and merchandiser cart 20 in general, are constructed to bear substantial weight loads and to support products against displacement and additional stress occurring during over-the-road transportation of the product loaded cart from production facility to the food store or point of sale; and the cart 20 is adapted to all types of truck loading equipment. The abutment surfaces 53 of the shelf front rails 46 are substantially normal to the product surfaces of the main panels 45 and have a predetermined depth greater than the depth of the abutment surfaces 59 of the shelf rear rails 47. These product abutment surfaces 53 and 59 also are spaced a predetermined distance so that the product carrying area of the shelves 24, as defined by the front and rear rail abutments 53 and 59 and the side rail flanges 61, essentially accommodate a certain quantity of the product, such as milk containers M (as shown in phantom lines in FIG. 2).

It will be apparent that the back side of the merchandiser cart 20 is open and is adapted for rear loading of product by automatic handling equipment in the production facility onto the shelves 24 over the relatively short rear rail abutment flanges 58. The product, milk containers M, slide down the sloping shelf panels 45 against the product abutment and holding surfaces 53 of the front rails 46 and each shelf is filled with the selected product or size of product with the last or rear product row fitting against the rear rail abutment surface or lip 59. By reason of the shelf angularity, the weight or direction of load of the product containers M is downwardly and forwardly toward the front rail 46 where the substantial depth of the abutment surface 53 retains the front row of product containers and the interface or surface engagement between adjacent rearward containers and load imposed acting on the front row prevents displacement. However, the front row container M can be lifted upwardly over the front rail 46 by the store customer. It should be recognized that the usual plastic coated (formerly waxed) milk container M does not by itself usually have a straight side wall, but bulges slightly above the base so that the center of weight or load is in the lower one-third of the container. Accordingly, the containers M on a fully loaded shelf 24 are not literally wedged in place on the product carrying shelf surface 45, but this inherent property is utilized in achieving a similar result at a point slightly above the rear rail flanges 58 and the transverse shelf area dimension is predetermined to obviate this wedging effect. Upon removing a front row container M, the rearward containers slide downwardly against the front rail 46.

As previously indicated, the anti-friction shelf surface characteristics are an important feature in addition to the downwardly and forwardly sloping angularity of the shelves 24 for gravity or self-feeding of containers M to the front rail 46 for dispensing. The plurality of parallel ridges 49 of the main shelf panels 45 form glide surfaces on which the bases B of the containers M sit in substantially line contact. It should be noted that the ridges 49 are relatively closely spaced so that the weight load of each container is distributed to several ridges whereby an improved glide surface is provided. The valleys 50 of the corrugated shelf panels 45 form spill channels so that any leakage of liquid from imperfect or damaged containers M will be diverted down into the transverse spill channel 52 of the front rail 46. It will be understood that the shelves 24 or main panels 45 thereof may be formed of any suitable material, such as stainless steel, fiberglass or the like, but stainless steel with a so-called satin finish applied with the "grain" running in the direction of the ridges 49 has been discovered to produce a superior surface. It is also possible to coat the shelf panel with a suitable pebbled vinyl or other anti-friction material to improve the glide characteristics thereof.

Referring now particularly to FIG. 2, the merchandiser cart 20 is illustrated in combination with a refrigerated showcase 65 for display and dispensing of product M. The showcase 65 comprises a movable low front wall 66 obscuring the base 21 of the cart 20 and defining a return air flow channel 67 in front of and under the cart for movement of refrigerated air to a fan 68, which discharges or recycles such air upwardly in a rear duct 69 to an evaporator coil 70 positioned in a chamber 71 in the top of the showcase 65. The air flows forwardly across and through the evaporator 70 for recooling and is discharged downwardly through an air straightening means 72, such as honeycomb, and forms a curtain 73 of refrigerated air across the display opening of the showcase to maintain a predetermined product temperature. The rear panel 74 of the showcase forming the duct 69 is disposed at a pre-determined angle to vertical, and it will be seen that the front and rear members 35 and 36 of the cart end panel 23 are also angularly canted or disposed from vertical so that the rear members 36 form a complementary fit against the rear panel 74 and prevent short-circuiting of air flow behind the cart 20 to the fan 68. The length of the showcase 65 between its ends 75 is predetermined to accommodate multiple carts 20, but vertical case partitions 76 are provided intermediate the ends 75 between each cart to provide a close tolerance preventing any substantial short-circuiting of air and assisting in rectilinear air flow in the air curtain 73 especially when an empty cart 20 is removed from the showcase 65 for replacement by a product loaded cart 20. In addition to the complementary cart-to-showcase fit achieved by the angularity of the cart end panels 23 and showcase rear wall 74, it will be seen that the front rail 46 of each successively higher shelf 24 in the merchandiser cart 20 is recessed or set back slightly further relative to a vertical line and corresponds to the angularity of the end panels 23 whereby an angular flow of the air curtain 73 downwardly accommodates improved air control and maintenance of more even temperature. It will also be noted that the merchandiser cart 20 provides for improved product display due to the angularity of the shelves 24 whereby the product is canted forwardly to expose both the top and front side surface and due to the opposite angularity of the end panel front members 35 and corresponding shelf recess whereby the product on each successively lower shelf 24 is set forwardly and exposed both to the refrigerated air curtain for cooling and to the view of the store customer. The angular walls 54 of the front rails 47 project to adjacent the front edges of the end panel front members 35 and slightly beyond the most forward portion of the product to function as bumper guards for the protection of the product on the cart 20.

Referring now to FIG. 3 in which another preferred embodiment of the invention is shown and in which similar reference numerals in the "100 series" will identify like or similar parts to the previously described embodiment, this embodiment comprises a nestable merchandiser cart 120 adapted, when empty and ready to be returned to the production facility, to be interfit or "nested" into similar carts 120 thereby saving space and permitting more empty carts to be returned than may be delivered.

The cart 120 has a main base frame 121 mounted on rear and front wheel units 122a and 122b, opposed end panels 123 secured to the base frame 121 and a plurality of shelves 124. The rear wheel units 122a are secured to the base frame rear wall 127 at the ends thereof and have a structural frame extension and cover plate 103 projecting rearwardly and mounting the caster-type wheels 128. Similarly, the front wheel unit 122b has a structural frame extension and cover plate 104 secured on the base frame front wall 126 intermediate the end portions thereof and mounts the caster-type wheels 128 within the spaced distance between the frame extensions 103. The end panels 123 and shelves 124 are essentially identical to the shelves 24 previously described, but the shelves 124 are cantilevered in front and back of the front and rear members 135 and 136 of the end panels 123 and the wheels 128 are still widely spaced to stabilize the cart 120. The front wheel unit 122b is adapted to fit between the rear wheel units 122a and abut the base frame rear wall 127 of another similar cart, and the angularity of the shelves 124 permits the front rail portions 146 of one cart to be received under the rear rail portions 147 of another cart so that the carts 120 can be nested.

It will be understood that steam cleaning or the like of the novel merchandiser cart 20, 120 at the production facility is important to remove any foreign matter or spillage of product therefrom to maintain a sanitary condition and to keep the anti-friction glide surfaces 49, 149 of the shelves 24, 124 cleaned of plastic or wax from the containers M and otherwise in a non-resistant condition to movement of the product during loading at the production facility or self-feeding of product to the front rail 46, 146 during display and customer removal of front row containers.

This invention is intended to cover all changes and modifications of the examples of the invention herein chosen for purposes of the disclosure which do not constitute departures from the spirit and scope of the invention.

What is claimed is:

1. In combination: a refrigerated showcase having a product display area with a front access opening, air discharge means in front and above said display area for discharging a curtain of refrigerated air across said access opening, air return means in front and below said display area for receiving refrigerated air from said curtain, and air passage means in communication with said air return and discharge means including a vertically disposed rear duct defined in part by a panel forming the rear wall of said product area, and means for cooling and circulating refrigerated air in said air passage means, said panel of said rear duct being positioned at a predetermined angle relative to vertical to slope rearwardly upwardly from the lower portion of said display area, and movable product merchandiser means positioned in said display area and comprising a plurality of vertically spaced shelves of substantially equal depth, said shelves being in offset relation with the front and rear margins of each successively higher shelf being recessed rearwardly of the next lower shelf relative to vertical, the rear margins of said shelves being in abutting engagement with said angular panel of said rear duct, and the vertical angularity of said recessed front margins of said shelves accommodating an angular downward flow of said curtain of refrigerated air.

2. In combination: a mobile merchandiser cart having a base frame mounted on wheel units, upstanding opposed end panels secured to said base frame including front and rear margins, and a plurality of vertically spaced shelf means secured between said end panels and extending between said front and rear margins to form product bearing surface means; a refrigerated showcase having an open front cart product area for at least one of said merchandiser carts and comprising a refrigerated air discharge in front and above said cart for forming an air curtain across said open front, a removable low front wall for receiving said cart and forming a front air passage, other passage means extending from said front wall to said air discharge including a vertically disposed rear duct with a panel in part defining said product area, and air moving and evaporator means in said air passages for circulating and refrigerating air for cooling the product on said cart; and said rear panel of said showcase and the rear margins of said end panels and shelves being angularly disposed relative to vertical and in abutting engagement to minimize short-circuiting of the showcase air flow in by-pass relation to the product on the shelves of said cart.

* * * * *